Dec. 10, 1968     F. DRUSEIKIS     3,415,132

WINDSHIELD WIPER DRIVE MECHANISM

Filed Oct. 3, 1966     3 Sheets-Sheet 1

INVENTOR
Frederick Druseikis
BY
Donald P. Selucki
ATTORNEY

Dec. 10, 1968　　　　　F. DRUSEIKIS　　　　　3,415,132
WINDSHIELD WIPER DRIVE MECHANISM

Filed Oct. 3, 1966　　　　　　　　　　　　　3 Sheets-Sheet 2

INVENTOR
Frederick Druseikis
BY
Donald P. Selucki
ATTORNEY

Dec. 10, 1968     F. DRUSEIKIS     3,415,132

WINDSHIELD WIPER DRIVE MECHANISM

Filed Oct. 3, 1966     3 Sheets-Sheet 3

INVENTOR
Frederick Druseikis
BY
Donald P. Selucki
ATTORNEY

United States Patent Office 3,415,132
Patented Dec. 10, 1968

3,415,132
WINDSHIELD WIPER DRIVE MECHANISM
Frederick Druseikis, Kettering, Ohio, assignor to General Motors Corporation, Detroit, Mich., a corporation of Delaware
Filed Oct. 3, 1966, Ser. No. 583,608
3 Claims. (Cl. 74—42)

ABSTRACT OF THE DISCLOSURE

In a preferred form, this disclosure relates to a drive mechanism for oscillating a windshield wiper through a given angular sweep between first and second positions during running operation and through a greater angular sweep to a parked position spaced from the first position when running operation is being terminated. The drive mechanism includes a drive means for reciprocating a drive link, a lever pivotally supported for oscillatory movement in opposite directions about a fixed axis and which is drivingly connected with the windshield wiper to effect oscillatory movement of the latter when the lever is being oscillated, a second link pivotally connected to the lever and pivotally connected to the drive link by a pivot pin means and with the pivot pin means also being received within a generally radially extending slot in the lever. The pivot pin means is shiftable within the slot between a first position in which engages an outer end surface to provide a first effective lever arm for the lever and a second position in which it engages an inner end surface to provide a second effective lever arm which is of a lesser length than the first effective lever arm. The drive mechanism also includes a control means which is operable to move and hold the pivot pin means in its first position during running operation of the windshield wiper and to move and hold the pivot pin means in a second position when running operation is being terminated and initiated, respectively.

---

This invention relates to variable drive mechanisms and more particularly a windshield wiper drive mechanism.

When a windshield wiper is installed for operation on a glass forming a portion of the tailgate or a station wagon type vehicle, it is important that the windshield wiper oscillate in the open area above the body panel and below the roof while still maintaining the tailgate with a capability for opening without interference from the windshield wiper. This necessitates either parking the windshield wiper off the glass or on the glass at a point below the level of the metal body panel of the tailgate. It is therefore desirable to oscillate a windshield wiper through a predetermined arcuate course, said course being completely within the window opening, and later parking the windshield wiper at some point away from the course the wiper took during a wiping action.

It is an object of the present invention to provide a windshield wiper drive mechanism which electromechanically changes the length of the sweep pattern of the windshield wiper.

It is another object of the present invention to provide an improved windshield wiper drive mechanism which is electrically driven and which, when deenergized, automatically lengthens the sweep pattern of the windshield wiper blade to bring it to a park position where it will not interfere with the operation of a movable window.

It is still another object of the present invention to provide a windshield wiper drive mechanism for the rear movable window of a station wagon type vehicle which generates a first desired sweep pattern for a wiping cycle and then selectively lengthens a portion of the sweep pattern to provide a parking capability for the windshield wiper.

Further objects and advantages of the present invention will be apparent from the following description, reference being had to the accompanying drawings wherein a preferred embodiment of the present invention is clearly shown.

Figure 1:
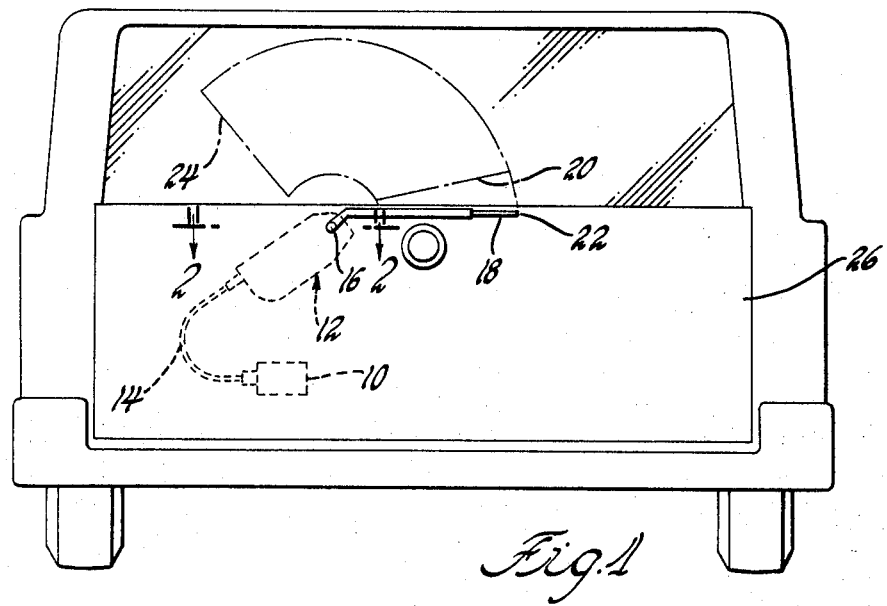
FIGURE 1 is an elevational view of the subject invention shown in its operative environment.

Referring to FIGURE 1, a station wagon type vehicle is shown in rear elevation with the diagrammatic showing of an electric motor 10 driving drive mechanism 12, which is the subject of the present invention, through a flexible cable 14. Output member 16 from drive mechanism 12 moves windshield wiper blade 18 in two sweeps, a first of which terminates along line 20 and a second of which terminates along line 22. Movement of wiper blade 18 between lines 20 and 24 sets forth the first sweep pattern of the running mode while the extension of this sweep pattern to line 22 designates the park position of the wiper blade and sets forth an extreme of movement in the park mode.

Figure 2:
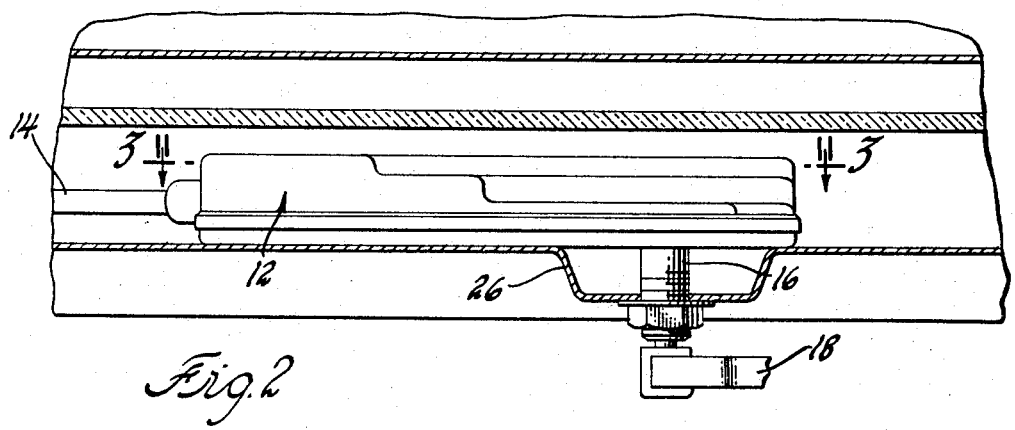
FIGURE 2 is a sectional view taken along line 2—2 of FIGURE 1.

FIGURE 2 is a sectional view taken through the station wagon tailgate setting forth the flat configuration of drive mechanism 12 with output member 16 protruding through the outside body panel 26 to drive blade 18 in a wiping action.

Figure 3:
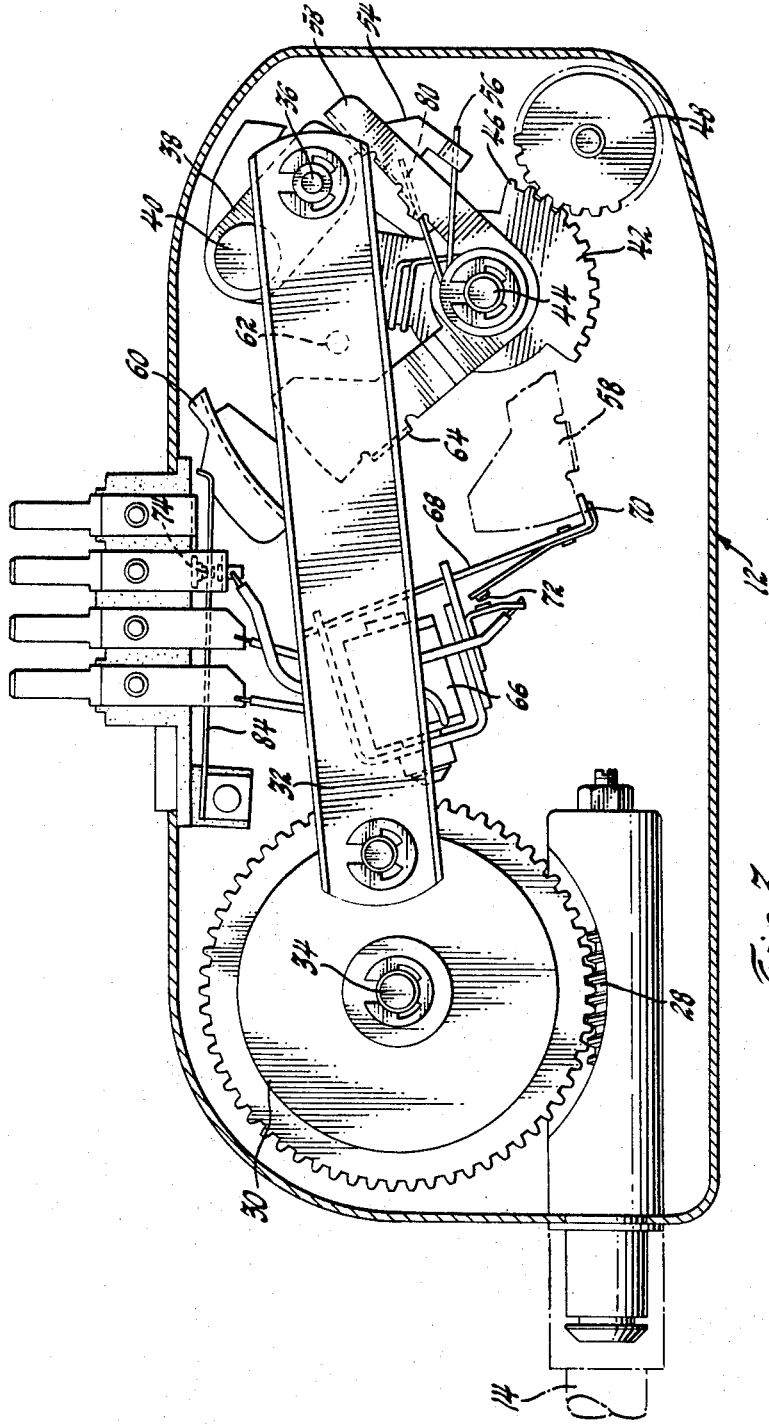
FIGURE 3 is a sectional view taken along line 3—3 of FIGURE 2 setting forth a portion of the inventive structure in elevation.

Referring to FIGURE 3, cable 14 enters the housing for the drive mechanism, generally designated by the numeral 12, and terminates with a worm gear 28 operatively engaging input gear 30. Input gear 30 is rotationally driven in a clockwise manner, as viewed in FIGURE 3, and draws drive link 32 in a crank type motion in a clockwise manner relative to pivot point 34 due to the mounting of drive link 32 pivotally near the periphery of input gear 30. Drive link 32 is also pivotally supported at an opposite end from input gear 30 by shifter pin 36 carried by link plate 38. Link plate 38 is in turn pivotally supported by pivot 40 carried by drive segment 42. Drive segment 42 is pivotable on pivot 44 carried in fixed relationship with respect to drive mechanism housing 12.

It is clear then from the examination of FIGURE 3 that rotation of input gear 30 results in a reciprocating crank type motion of drive link 32 which, due to engagement of drive link 32 with drive segment 42 to link plate 38, results in an oscillatory movement of the gear portion 46 of drive segment 42 which engages windshield wiper drive gear 48 carrying output member 16.

Figure 4:
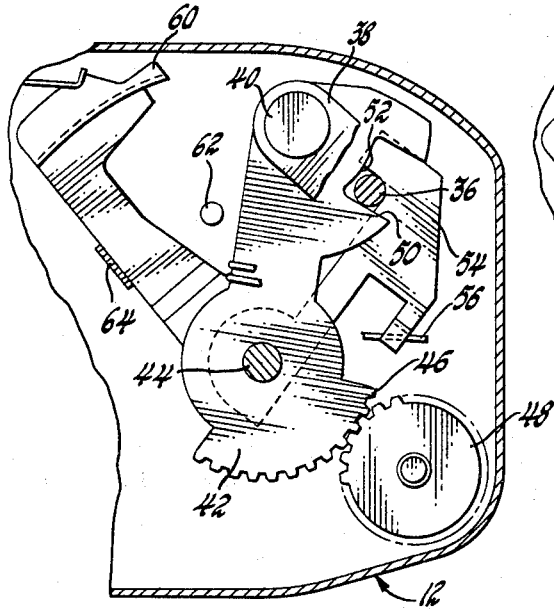
FIGURE 4 is an elevational view of the subject invention with said operative structure therein shown in the configuration the structure assumes during a parking mode.
Figure 5:
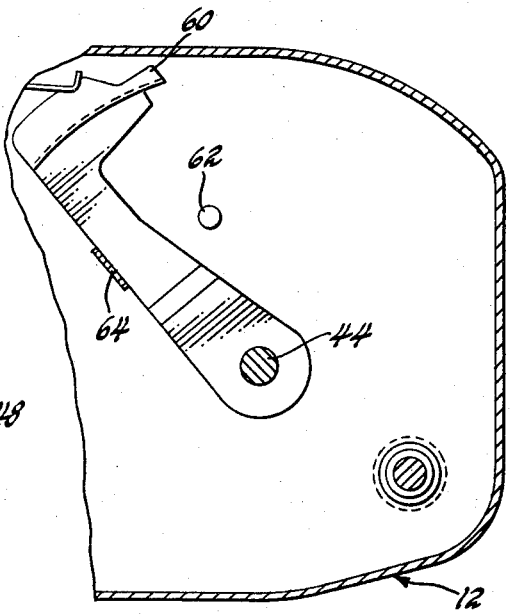
FIGURE 5 is an elevational view of a switch lever of the subject invention shown in the parking mode.
Figure 6:
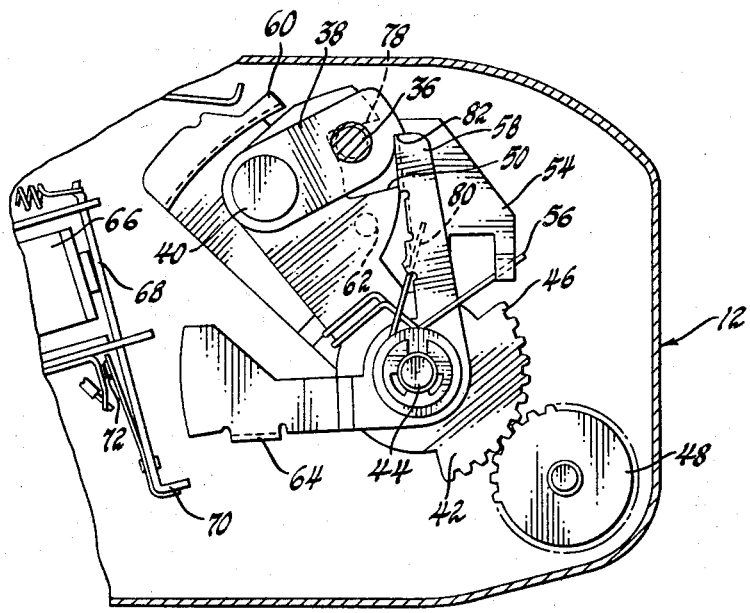
FIGURE 6 is an elevational view of said operative portions of the subject invention with the structure shown in the running mode.

Referring to FIGURE 4, which depicts a park mode with the windshield wiper blade 18 positioned along line 22, as viewed in FIGURE 1, it is seen that shifter pin 36 rests against surface 50 of a slot 52 formed in drive segment 42. When positioned against surface 50, shifter pin 36 is held thereagainst by park lever 54 spring loaded in a counterclockwise direction around pivot 44 by spring 56. An examination of FIGURE 4 and FIGURE 6 clearly shows that the driving connection of drive link 32 with drive segment 42 is through link plate 38 and the amount of oscillatory movement generated in drive segmented 42 depends on the length of the lever arm represented by the distance shifter pin 36 is situated away from pivot 44. It is clear that the positioning of shifter pin 36 relative to pivot 44, as viewed in FIGURE 4, is less than the length of the arm measured by the distance of shifter pin 36 from pivot 44 as seen in FIGURE 6. Therefore, the same amount of reciprocating movement of drive link 32 generated by input gear 30 in the environment of FIGURE 4 will result in a greater movement of geared portion 46 around pivot 44 thereby engendering a greater arcuate movement for drive gear 48 than would be generated with the configuration shown in FIGURE 6. This great oscillatory sweep that is generated when shifter pin 36 is positioned as shown in FIGURE 4 results in approximately 11° greater sweep of the windshield wiper blade allowing it to move to line 22, as viewed in FIGURE 1, for parking purposes. This is opposed to the normal sweep pattern of the blade 18 between lines 20 and 24 generated while shifter pin 36 is positioned as shown in FIGURE 6.

Referring to FIGURE 3, run lever 58 is freely pivotable on pivot 44 as is switch lever 60. Run lever 58 is limited in its counterclockwise rotation around pivot 44, as illustrated in FIGURE 3, by stop pin 62 carried by drive mechanism housing 12. In addition, upstanding flange 64 formed as a portion of run lever 58 is positioned in interference with the rotating path of switch lever 60 around pivot 44.

Relay 66 has operatively associated therewith pivotable contact lever 68 having upstanding flange 70 positioned in the rotating path of run lever 58 around pivot 44. Contacts 72 are electrically paralleled with contacts 74 to complete an electrical path to motor 10 alone or together in any well-known fashion. Relay 66 is energizable by any well-known expedient, such as the typical wiper switch located in the driving compartment of the vehicle.

In operation, it will be assumed that the drive mechanism is in a park position, as illustrated in FIGURE 3 and in FIGURE 4. When it is desired to operate the windshield wiper which will be demonstrated by a movement of blade 18 between lines 20 and 24, as viewed in FIGURE 1, relay 66 is energized in a conventional manner. Contact lever 68, as seen in FIGURE 3, is drawn toward electromagnet 66 closing contacts 72. Motor 10 is thereby energized resulting in rotation of cable 14 and worm gear 28 to rotate input gear 30 in a clockwise fashion, as viewed in FIGURE 3.

When input gear 30 begins to rotate, drive link 32 is drawn around pivot 34 which results in a counterclockwise motion of drive segment 42 relative to pivot 44. This is accomplished through the interconnection for drive link 32 with drive segment 42 through shifter pin 36 and link plate 38. An examination of FIGURE 3 shows that shifter pin 36 located against surface 50 on drive segment 42, which is better seen in FIGURE 4, causes drive segment 42 to rotate in a counterclockwise manner relative to pivot 44 and induces a clockwise movement to drive gear 48. The running cycle is thereby initiated.

As previously stated and best seen in FIGURE 4, shifter pin 36 is held against surface 50 by spring loaded park lever 54. As drive link 32 draws drive segment 42 in a counterclockwise manner around pivot 44, park lever 54 follows this movement and pivots counterclockwise around pivot 44. Park lever 54 rotates in a counterclockwise fashion as far as stop pin 62 which holds it against further rotation. Drive link 32 continues to draw drive segment 42 in a counterclockwise fashion but park lever 54 does not follow this motion and shifter pin 36 is no longer latched against surface 50. However, the directional forces of drive link 32 pull shifter pin 36 away from surfaces 50 before one-half revolution of drive link 32 around pivot 34 has been completed. Therefore, shifter pin 36 assumes a position against surface 78 as seen best in FIGURE 6. It is obvious, then, that the length of arm measured between shifter pin 36 and pivot 44 has increased, resulting in a shorter oscillatory sweep of drive segment 42 and, consequently, wiper blade 18.

It should also be noted that run lever 58 is also biased in a counterclockwise direction around pivot 44 and spring 80. While in a parking mode, as seen in FIGURE 3, run lever 58 is held against counterclockwise movement by the end of link plate 38. Referring to FIGURE 6, when shifter pin 36 and, consequently, link plate 38 move outwardly in a counterclockwise direction around pivot 40 and, when park lever 54 unlatches, run lever 58 bearing against the outer end of link plate 38 eventually engages notch 82 in link plate 38 to latch plate 38 and shifter pin 36 against surface 78 of drive segment 42. Switch lever 60 is picked up by shifter pin 36 at its extreme of movement to drive switch lever 60 into contact 74 closing a parallel run circuit with motor 10. Therefore, during this mode of operation motor 10 is energized both by the contacts 72 and the closed contacts 74. The mechanism will continue to oscillate in the run mode of operation as long as relay 66 is energized.

The shaft from run to park mode is achieved in the following manner. Relay 66 is deenergized allowing spring loaded contact lever 68 to assume the position shown in FIGURE 3. When in this position, it is seen that flange 70 interferes with an end of run lever 58 in that it is positioned in its oscillatory path. It should be noted that contacts 74 are yet engaged and power is still provided to motor 10. When run lever 58 engages flange 70, it is stopped just short of the end of its normal oscillatory extreme of movement which occurs when drive length 32 is positioned 180° forward of the point shown in FIGURE 3 around pivot 34. Run lever 58 therefore is driven from notch 82 shown in FIGURE 6 just as the directional forces from drive link 32 to shifter pin 36 reverses at the end of the stroke. Therefore, shifter pin 36 is immediately driven back to surface 50 on drive segment 42 and run lever 58 resumes its park mode position against the end of link plate 38. Run lever 58 is thereby drawn in a clockwise manner, as viewed in FIGURE 3, and, at some point in the reverse stroke of drive link 32, flange 64 picks up switch lever 60. Contemporaneous therewith, park lever 54 is allowed to latch around shifter pin 36 holding it against surface 50 assuming thereby the position shown in FIGURE 4. The length of the arm measured between shifter pin 36 positioned against surface 50 relative to pivot 44 results in a greater movement of drive segment 42 causing drive gear 48 and blade 18 to make a longer sweep. As the system is designed, when blade 18 assumes a position along line 22, drive link 32 assumes the position shown in FIGURE 3 wherein park lever 54 has rotated sufficiently to drive switch lever 60 off spring loaded arm 84 resulting in the disengagement of contacts 74. Motor 10 is thereby deenergized and the rotation of gear 30 ceases and blade 18 remains positioned along line 22 as viewed in FIGURE 1.

The subject mechanism is particularly adapted to provide an extra movement during an oscillatory sweep of the windshield wiper at an extreme of its travel to move it into a park position wherein a movable window being wiped can be opened without interference from the windshield wiper and also allows the parking of the windshield wiper in a concealed position wherein the view through the window opening is not obscurred.

While the embodiment of the present invention, as herein disclosed constitutes a preferred form, it is to be understood that other forms might be adopted.

What is claimed is as follows:

1. A drive mechanism for oscillating a windshield wiper through a given angular sweep between first and second positions during running operation and through a greater angular sweep to a parked position spaced from the first position when running operation is being terminated, comprising: a drive link; a drive means for reciprocating said drive link; lever means pivotally supported for oscillatory movement in opposite directions about a fixed axis and having radially spaced inner and outer surfaces thereon, said lever means being adapted to be drivingly connected with the windshield wiper and effecting oscillatory movement of the latter in response to its being oscillated in opposite directions; a second link pivotally connected to said lever means at a location remote from said fixed axis, said second link at a location spaced from its pivotal connection with said lever means being pivotally connected to said drive link by a pivot pin means and with the pivot pin means also being received between said inner and outer surfaces on the lever means; said pivot pin means being shiftable between a first position in which it engages the outer surface to provide a first effective lever arm for said lever means to effect movement of said windshield wiper through said given angular sweep and a second position in which it engages the inner surface to provide a second effective lever arm which is of a lesser length than said first effective lever arm to effect movement of the windshield wiper through said greater angular sweep, and means including holder means for effecting movement of the pivot pin means to and for holding the same in its first and second positions during running operation of the windshield wipers and when running thereof is being terminated, respectively.

2. A drive mechanism for oscillating a windshield wiper through a given angular sweep between first and second positions during running operation and through a greater angular sweep to a parked position spaced from the first position when running operation is being terminated, comprising: a drive link; a drive means for reciprocating said drive link; a lever pivotally supported for oscillatory movement in opposite directions about a fixed axis and having a slot therein extending generally radially of the fixed axis and terminating in inner and outer end surfaces, said lever being adapted to be drivingly connected with the windshield wiper and effecting oscillatory movement of the latter in response to its being oscillated in opposite directions; a second link pivotally connected to said lever at a location remote from said fixed axis, said second link at a location spaced from its pivotal connection with said lever being pivotally connected to said drive link by a pivot pin means and with the pivot pin means also being received within said slot, said pivot pin means being shiftable between a first position in which it engages the outer end surface to provide a first effective lever arm for the lever to effect movement of the windshield wiper through said given angular sweep and a second position in which it engages the inner end surface to provide a second effective lever arm which is of a lesser length than the first effective lever arm to effect movement of the windshield wiper through said greater angular sweep, and control means operable to hold said pivot pin means in its second position as said windshield wiper is moved from its parked position toward its second position during its first operative sweep when operation is initiated, to effect movement of the pivot pin means from its first position to its second position and to hold the same in the second position during running operation and to effect movement of the pivot pin means from its second position to its first position and to hold the same in the first position when running operation is being terminated.

3. A drive mechanism for oscillating a windshield wiper through a given angular sweep between first and second positions during running operation and through a greater angular sweep to a parked position spaced from the first position when running operation is being terminated, comprising: a drive link; a drive means for reciprocating said drive link; a first lever pivotally supported for oscillatory movement in opposite directions about a fixed axis and having a slot therein extending generally radially of the fixed axis and terminating in inner and outer end surfaces, said lever being adapted to be drivingly connected with the windshield wiper and effecting oscillatory movement of the latter in response to its being oscillated in opposite directions; a second link pivotally connected to said first lever at a location remote from said fixed axis, said second link at a location spaced from its pivotal connection with said first lever being pivotally conneced to said drive link by a pivot pin means and with the pivot pin means also being received within said slot, said pivot pin means being shiftable between a first position in which it engages the outer end surface to provide a first effective lever arm for the first lever to effect movement of the windshield wiper through said given angular sweep and a second position in which it engages the inner end surface to provide a second effective lever arm which is of a lesser length than the first effective lever arm to effect movement of the windshield wiper through said greater angular sweep, and electro-mechanical control means operable to hold said pivot pin means in its second position as said windshield wiper is moved from its parked position toward its second position during its first operative sweep when operation is initiated, to effect movement of the pivot pin means from its first position to its second position and to hold the same in the second position during running operation and to effect movement of the pivot pin means from its second position to its first position and to hold the same in the first position when running operation is being terminated, said control means including second and third levers pivotally supported for movement in opposite directions about said fixed axis and which are spring biased toward said first lever, said second lever being cooperably engageable with said pivot pin means when the latter is in its second position to hold the same in its second position and said third lever being cooperably engageable with the second link to hold the pivot pin means in its first position when moved thereto, said second lever being engageable with a stop disposed in its path of movement as the wiper is moved from its parked position towards its second position to release the pivot pin means for movement from its second position toward first position, and means including a trip member engageable with said third lever to effect a release of the same from the second link to allow the pivot pin means to be moved from its first position towards its second position when running operation is being terminated.

References Cited

UNITED STATES PATENTS

| | | | |
|---|---|---|---|
| 2,121,233 | 6/1938 | Horton | 74—42 |
| 2,786,175 | 3/1957 | Rohr | 74—42 |
| 2,291,474 | 1/1960 | Ballard | 74—42 |
| 3,112,510 | 12/1963 | Forbrush et al. | 15—250.16 |

FRED C. MATTERN, JR., *Primary Examiner.*

WESLEY S. RATLIFF, *Assistant Examiner.*

U.S. Cl. X.R.

15—250.16

UNITED STATES PATENT OFFICE
CERTIFICATE OF CORRECTION

Patent No. 3,415,132 December 10, 19

Frederick Druseikis

It is certified that error appears in the above identified patent and that said Letters Patent are hereby corrected as shown below:

Column 1, line 43, "or" should read -- of --. Column 6, line 57, "2,291,474" should read -- 2,921,474 --.

Signed and sealed this 10th day of March 1970.

(SEAL)
Attest:

Edward M. Fletcher, Jr.
Attesting Officer

WILLIAM E. SCHUYLER, JR.
Commissioner of Patents